United States Patent [19]
Sako et al.

[11] Patent Number: 5,896,355
[45] Date of Patent: Apr. 20, 1999

[54] DATA RECORDING/REPRODUCING APPARATUS CORRESPONDING TO A PLURALITY OF ERROR CORRECTING SYSTEM AND A DATA RECORDING MEDIUM

[75] Inventors: Yoichiro Sako, Chiba; Tamotsu Yamagami, Kanagawa, both of Japan

[73] Assignee: Sony Corporation, Tokyo, Japan

[21] Appl. No.: 08/647,643

[22] Filed: May 15, 1996

[30] Foreign Application Priority Data

May 18, 1995 [JP] Japan ................................. 7-143886

[51] Int. Cl.[6] ................................................ G11B 7/00
[52] U.S. Cl. ................................ 369/58; 369/59; 369/47
[58] Field of Search ................................ 369/54, 59, 58, 369/47, 48, 49; 371/38.1, 39, 40.1, 40.2, 41, 37.4

[56] References Cited

U.S. PATENT DOCUMENTS 4,788,685  11/1988  Sako et al. .
5,060,221  10/1991  Sako et al. .
5,568,467  10/1996  Inagaki et al. ................. 369/275.3

FOREIGN PATENT DOCUMENTS

0271335 A2   6/1988   European Pat. Off. .
0272135 A2   6/1988   European Pat. Off. .
0294490 A1  12/1988   European Pat. Off. .
0342833 A2  11/1989   European Pat. Off. .
0421871 A2   4/1991   European Pat. Off. .
0508762 A2  10/1992   European Pat. Off. .
6-309802     4/1994   Japan ................... G11B 20/12

*Primary Examiner*—Thang V. Tran
*Attorney, Agent, or Firm*—Limbach & Limbach L.L.P.; Seong-Kun Oh

[57] ABSTRACT

A data recording apparatus for recording digital data to a data recording medium is disclosed, that comprises an error correction code encoding means for interleaving a predetermined unit of data to be recorded and encoding the resultant data with an error correction code, and an identifying means for identifying whether the data to be recorded is reproduction-only data or rewritable data, wherein said error correction code encoding means is adapted for changing the interleave length corresponding to the output of said identifying means.

12 Claims, 10 Drawing Sheets

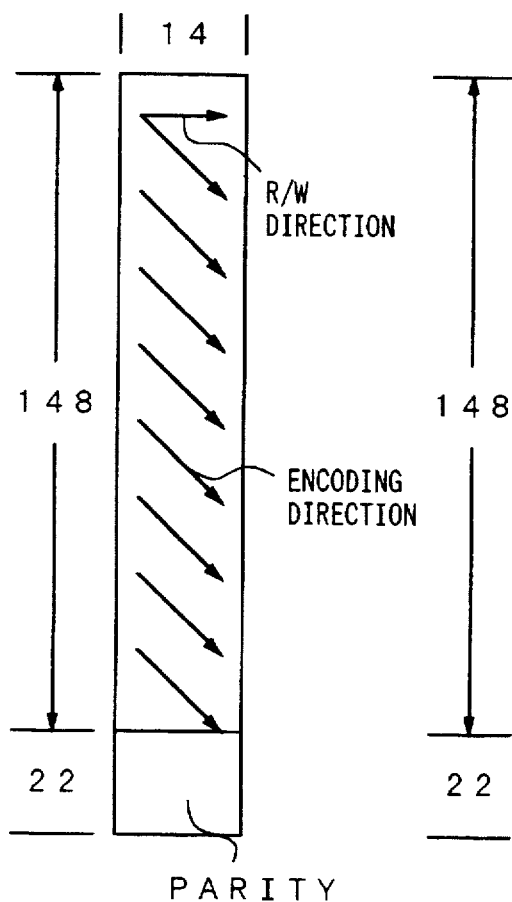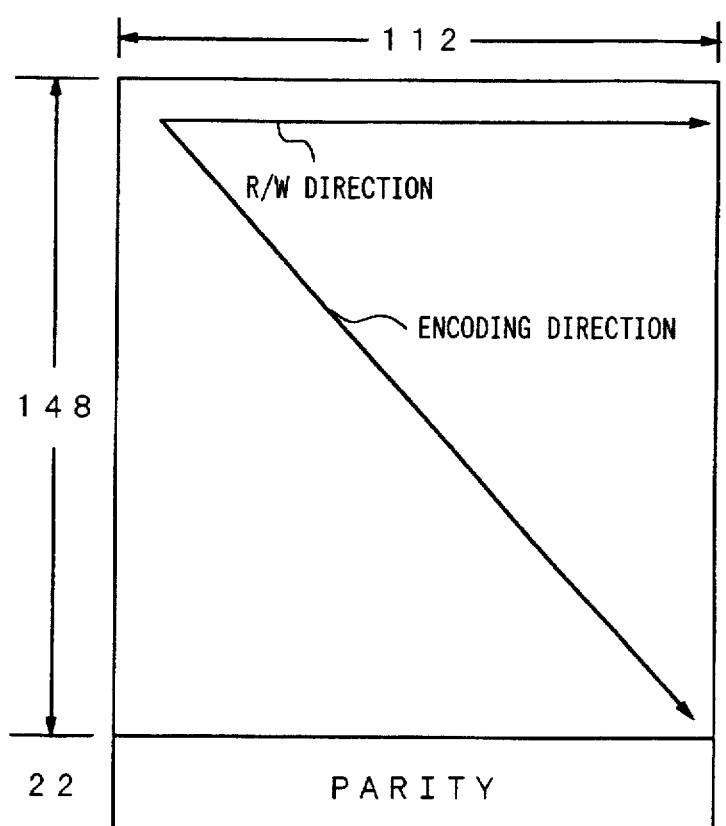
Fig. 12A
Fig. 12B

DATA RECORDING/REPRODUCING APPARATUS CORRESPONDING TO A PLURALITY OF ERROR CORRECTING SYSTEM AND A DATA RECORDING MEDIUM

BACKGROUND OF THE INVENTION

1. Field of the Invention

The present invention relates to a data recording/reproducing apparatus for properly performing an error correction code encoding process depending on whether a data recording medium is a recordable/reproducible type or a reproduction-only type, a method thereof, and a data recording medium.

2. Description of the Related Art

As external storing units for use with computers, from view points of large storage capacity and high access speed, optical disc drives are popular. CD-ROM (or CD-I (CD interactive)) drives and MO (magneto-optical disc) drives have been rapidly and widely used. An MO disc is one type of erasable discs. In addition, an MD (mini-disc) that is an erasable type disc has been proposed. Moreover, as a picture record medium, a DVD (digital video disc) is now under development.

The DVD is a reproduction-only disc with the same diameter as the diameter of the CD or a recordable/reproducible optical disc that is an MO type disc or a phase change type disc that reproduces or records/reproduces picture information compressed corresponding to the MPEG standard or the like. As well as the wavelength of laser rays decreases and the NA of an objective lens increases, the digital modulation and the error correction code encoding process have been improved, the recording density has been further improved. In the case that the DVD is a single layer type disc, the data storage capacity is as much as around 3.7 Gbytes. The CD and MD were originally developed for digital audio discs. Thereafter, these discs have been used for external storage mediums for computers. Likewise, the DVD with much larger storage capacity than the CD and MD is expected to be used for external storage medium for computers.

Data recording mediums such as optical discs can be categorized as a reproduction-type disc and a recordable/reproducible disc. In the recordable/reproducible disc, countermeasures against errors are performed by a data substituting process especially for computers. However, in the reproduction-only disc, since the data substituting process cannot be performed, a high error correction performance is required. In the reproduction-only disc, since data is continuously read, a relatively large sector size and a folding type encoding process can be used. However, in the recordable/reproducible disc on which data is randomly rewritten, data with a large sector size is not always continuously recorded on the disc. In addition, data should be unnecessarily reproduced for correcting errors. Thus, the throughput increases and the harmonization to the computers deteriorates.

Considering the difference in characteristics of the reproduction-only disc and the recordable/reproducible disc, dedicated error correction code encoding processes are performed for the reproduction-only disc and the recordable/reproducible disc. Thus, for these error correction code encoding process, dedicated algorithms for encoding and decoding processes are necessary. In addition, dedicated encoders and decoders must be designated for the error correction code encoding processes. Moreover, IC circuits for the encoder and decoder must be designed.

OBJECT AND SUMMARY OF THE INVENTION

Thus, an object of the present invention is to provide a data recording/reproducing apparatus for properly performing an error correction code encoding process depending on whether a data recording medium is a recordable/reproducible type or read-only type and for simplifying the error correction code encoding process with a common structure of basic portions for the process, a method thereof, and a data recording medium.

A first aspect of the present invention is a data recording apparatus for recording digital data to a data recording medium, comprising an error correction code encoding means for interleaving a predetermined unit of data to be recorded and encoding the resulting data with an error correction code, and an identifying means for identifying whether the data to be recorded is reproduction-only data or rewritable data, wherein said error correction code encoding means is adapted for changing the interleave length corresponding to the output of said identifying means.

A second aspect of the present invention is a data recording method for recording digital data to a recordable data recording medium, comprising the steps of interleaving a predetermined unit of data to be recorded and encoding the resultant data with an error correction code, recording the resultant data on the recording medium, and identifying the data to be recorded is reproduction-only data or rewritable data so as to change the interleave length, wherein the error correction code is a folding type code.

A third aspect of the present invention is a data reproducing apparatus for reproducing data from a data recording medium on which digital data has been recorded with an error correction code that has been interleaved and encoded, comprising a means for reproducing the digital data, an error correcting means for correcting an error of the reproduced digital data with the error correction code, and a means for detecting an identification signal from the reproduced digital data, wherein said error correcting means is adapted for deinterleaving the reproduced data corresponding to the identification signal.

A fourth aspect of the present invention is a method for correcting errors of a first type data recorded on a reproduction-only disc and a second type data recorded on a recordable disc, comprising the steps of determining whether data reproduced from a disc is the first type or the second type, and deinterleaving the reproduced data corresponding to the identified data and correcting errors of the resulting data.

A fifth aspect of the present invention is a disc-shaped recording medium having a reproduction-only region and a recordable region, each of which has an error correction code that is added to a predetermined unit of digital data and that is interleaved and encoded, the interleave length of the error correction code in the reproduction-only region being longer than that in the reproduction-only region.

A sixth aspect of the present invention is a method for encoding and decoding data recorded on a reproduction-only disc and a recordable disc with an error correction code, comprising the steps of identifying whether an input data is reproduction-only data or a rewritable data when the input data is recorded, interleaving the input data corresponding to the identified data and encoding the resulting data with the error correction code, identifying whether the input data is reproduction-only data or rewritable data when the input data is reproduced, and deinterleaving the reproduced data corresponding to the identified data and correcting an error of the resulting data with the error correction code.

When the dual code encoding process is performed, the interleave length for the ROM type disc is longer than that for the RAM type disc so as to protect an error of the ROM type disc and improve the access characteristic of the RAM type disc. Likewise, data to be recorded on the ROM type disc is encoded by the folding type dual code encoding process. Data to be recorded on the RAM type disc is encoded by the predetermined unit completion type encoding process. Moreover, the unit size of the error correction code encoding process for the ROM type disc is larger than that for the RAM type disc.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 12A and 12B are schematic diagrams for explaining an example of which the unit of the error correction code encoding process is varied.

DETAILED DESCRIPTION OF THE PREFERRED EMBODIMENT

Figure 1:
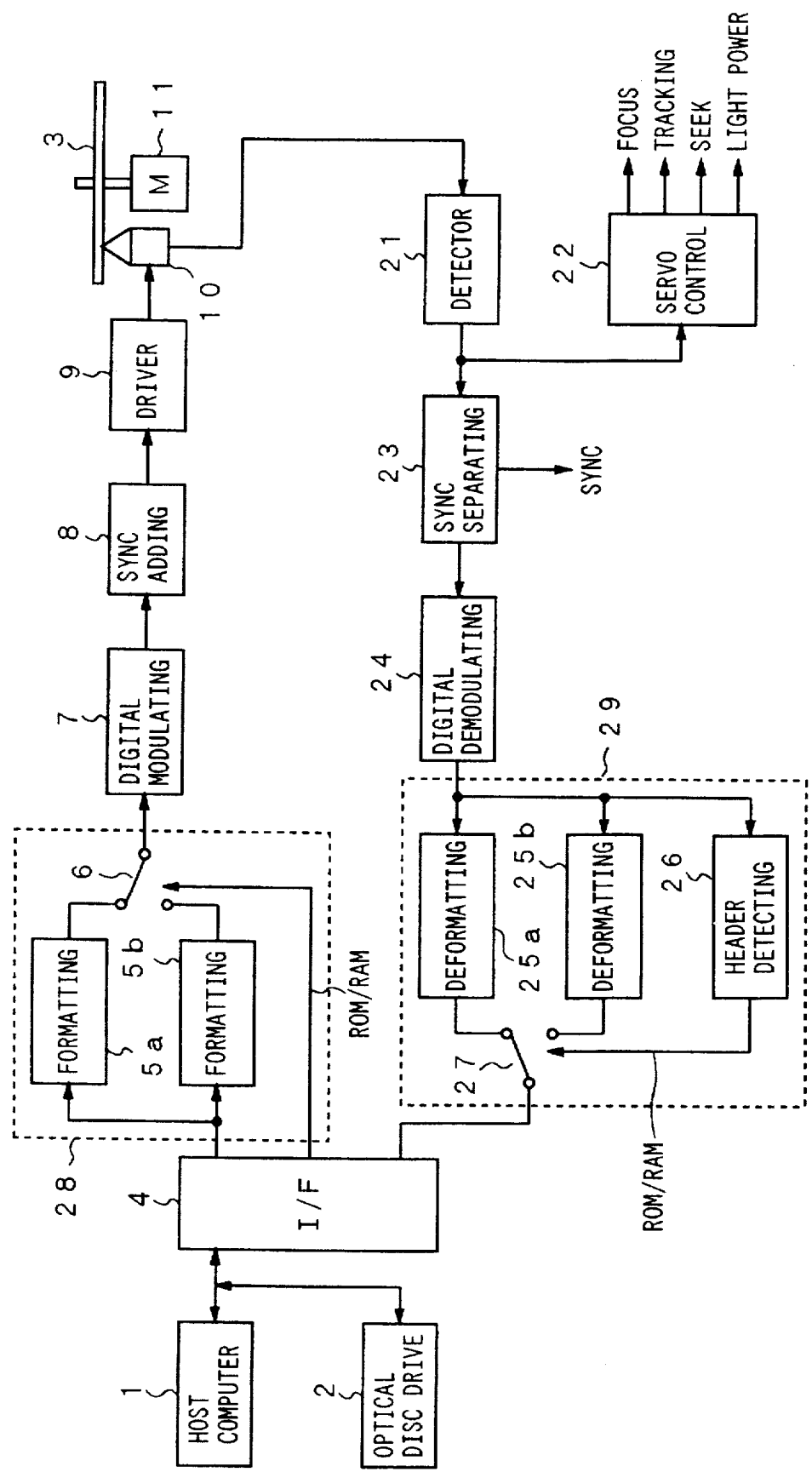
FIG. 1 is a block diagram showing a recording/reproducing circuit according to an embodiment of the present invention.

Next, with reference to the accompanying drawings, an embodiment of the present invention will be described. FIG. 1 is a block diagram showing a structure of an optical disc recording/reproducing system according to the present invention. In this embodiment, data received from a host computer 1 or an optical disc drive 2 is recorded on an optical disc 3. In addition, data is reproduced from the optical disc 3 and sent to the host computer 1.

The present invention can be applied to a mastering system for a read-only optical disc as well as a drive for a recordable/reproducible optical disc. Thus, the recording/reproducing system shown in FIG. 1 can be applied to an optical disc drive (such as a DVD drive) as an external storing device for a computer and a mastering system for a DVD-ROM disc. In the following description, the recordable/reproducible optical disc drive system is referred to as a RAM type, whereas the mastering system is referred to as a ROM type. A master tape reproducing device may be connected to an interface circuit 4.

In addition, the present invention can be applied to a drive that selectively uses a recordable/reproducible optical disc and a read-only type optical disc as the optical disc 3. In this case, a proper error correction code encoding process in the reproducing process is selected corresponding to the disc type for use.

Moreover, the present invention can be applied to the optical disc 3 that has a recordable/reproducible region and a read-only region. Likewise, a proper error correction code encoding process in the reproducing process is selected corresponding to the disc type for use.

Returning to FIG. 1, a recording/reproducing circuit according to the embodiment of the present invention will be described. Digital data received from the host computer 1 or the optical disc drive 2 is supplied to formatting circuits 5$a$ and 5$b$ through the interface circuit (I/F) 4 for example a SCSI interface. The formatting circuits 5$a$ and 5$b$ delimit digital data, sector by sector, and add a sector sync and a header to each sector so as to perform error correction code encoding process for each sector and an error correction code encoding process for data that is recorded or reproduced. Each header includes an identification information that represents whether the current disc is a ROM type or a RAM type. Alternatively, a record command that is supplied from the host computer 1 to the I/F 4 includes information that represents the ROM type or the RAM type.

Figure 2A:
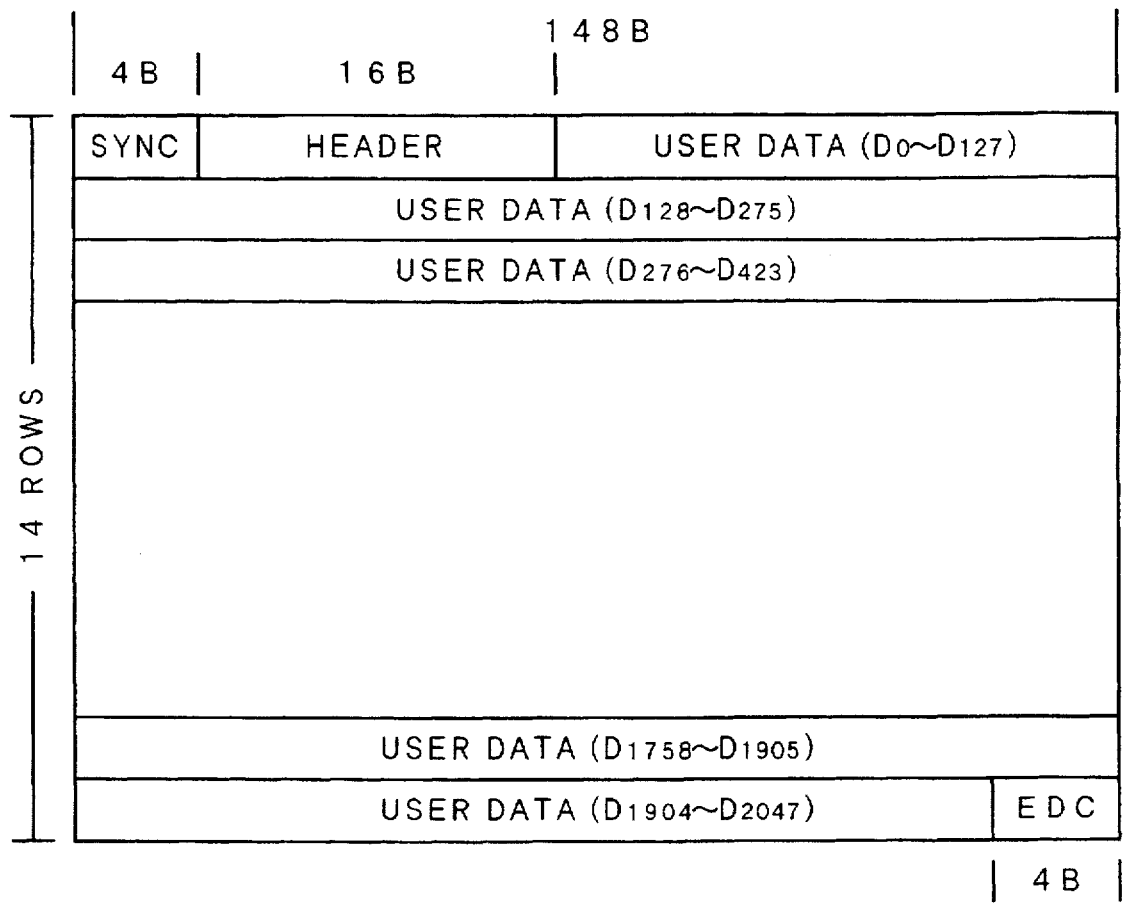
FIGS. 2A and 2B are schematic diagrams showing an example of a sector structure according to the present invention.

The formatting circuit 5$a$ converts the received data into RAM type sector structure data and performs a RAM type error correction code encoding process for the sector structure data. The formatting circuit 5$b$ converts the received data into a ROM type sector structure data and performs a ROM type error correction code encoding process for the sector structure data. The sector structure may be in common with both the RAM and ROM types. As an example of the sector structure, a sector format of 2,072 bytes composed of user data of 2,048 bytes, a sector sync of 4 bytes, a header of 16 bytes, and an error detection parity of 4 bytes is used as shown in FIGS. 2A and 2B.

Figure 2B:
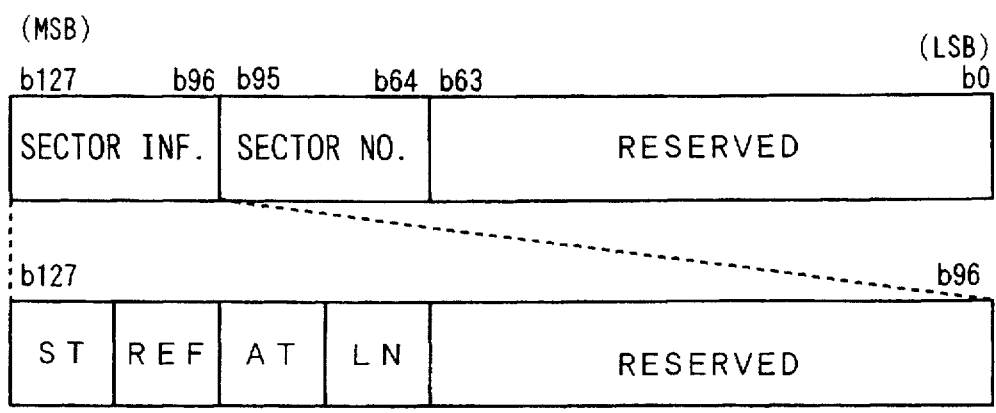

As shown in FIG. 2B, sector information of 4 bytes and a sector number of 4 bytes are recorded in the header portion. The sector information includes a sector type (ST), reflectivity information (REF), an area type (AT), and a layer number (LN). The sector type (ST) represents whether the current sector is the ROM type or the RAM type. The reflectivity information (REF) represents the reflectivity of the disc recording surface. The area type (AT) represents the type of an area of the current sector on the disc. The layer number (LN) represents that the current layer in the case that the disc has two layers. These items of the sector information are defined as follows.

| | |
|---|---|
| Sector type (ST) . . . | 0000: ROM type |
| | 0001: RAM type (MO) |
| | 0010: RAM type (PC) |
| Reflectivity (REF) | 0000: 0 to 20% |
| | 0001: 20 to 50% |
| | 0010: 50 to 70% |
| | 0011: 70 to 100% |
| Area type (AT) | 0000: Blank area |
| | 0001: Data recorded area |
| | 0010: Lead-in area |
| | 0011: Lead-out area |
| | 1111: Write protect area |
| Layer number (LN) | 0000: Layer 0 |
| | 0001: Layer 1 |

The output data of the formatting circuits 5a and 5b is selected by a switch circuit 6. The selected data is supplied to a digital modulating circuit 7. The switch circuit 6 selects the output data corresponding to a control signal received from the interface circuit 4. In the RAM type, the switch circuit 6 selects the output data of the formatting circuit 5a. In the ROM type, the switch circuit 6 selects the output data of the formatting circuit 5b. When a control signal is supplied from the interface circuit 4 to the formatting circuits 5a and 5b, one of these circuits can be operated.

The digital modulating circuit 7 maps, for example, a data symbol of 1 byte (8 bits) into a code word of 16 bits corresponding to a predetermined table and generates a modulated output data whose DC component is small. Alternatively, as a digital modulating method, the EFM method used for a CD, the 8-15 modulating method of which a data symbol of 8 bits is converted into a code word of 15 bits, or the like can be used. The output data of the digital modulating circuit 7 is supplied to a sync adding circuit 8. The sync adding circuit 8 adds a sync to each transmission frame (for example, every 32 code words). The output data of the sync adding circuit 8 is supplied to a driver 9. As an example of the sync, a special bit pattern that does not appear in digitally modulated data is used.

Record data is supplied to an optical pickup 10 through the driver 9 and then recorded on the optical disc 3. The record data is recorded by the magneto optical recording method or the phase change method. The optical disc 3 is rotated at CLV (constant linear velocity) or CAV (constant angular velocity) by a spindle motor 11. The minimum unit of data recorded/reproduced by the optical pickup 10 is one block that contains a predetermined number of sectors. Data that is recorded is immediately reproduced so as to determine whether or not an error takes place in the reproduced data (by a read-after-write operation). When an error is detected, the write operation is retried. When data is read, if the data has an error, the read operation is retried. After the read operation has been retried a predetermined number of times, if correct data cannot be obtained, an error message is sent to the user and the read operation is stopped.

Reproduction data read by the optical pickup 10 is supplied to a detector circuit 21 that includes an RF amplifier and a PLL circuit that extracts a clock. The output data of the detector circuit 21 is supplied to a servo controlling circuit 22 and a sync separating circuit 23. The servo controlling circuit 22 controls a focus servo, a tracking servo, and seek operation for the optical pickup 10, a laser power for the write operation, and so forth. The sync separating circuit 23 separates from the reproduction data a frame sync that has been added by the sync adding circuit 8.

The separated frame sync is supplied to a timing generating circuit (not shown). The timing generating circuit generates a timing signal that synchronizes with the reproduction data. The sync separating circuit 23 is connected to a digital demodulating circuit 24. The digital demodulating circuit 24 performs the reverse process of the digital modulating circuit 7 and generates data of which one symbol is restored to one byte.

The digital demodulating circuit 24 is connected to format separating circuits 25a and 25b and a header detecting circuit 26. The deformatting circuit 25a performs the reverse process of the formatting circuit 5a on the record side. The deformatting circuit 25b performs the reverse process of the formatting circuit 5a. The deformatting circuit 25a performs an error correction code decoding process, obtains user data from the RAM type sectors, and detects an error thereof. The deformatting circuit 25b performs an error correction code decoding process, obtains user data from the ROM type sectors, and detects an error thereof. The header detecting circuit 26 detects a header from each sector (see FIG. 2B) and determines whether or not the current disc is the ROM type or the RAM type corresponding to the header information (namely, the sector type).

One of the user data obtained by the deformatting circuits 25a and 25b is selected by a switch circuit 27 and then supplied to the interface circuit 4. The switch circuit 27 is controlled corresponding to the header information (ROM/RAM) received from the header detecting circuit 26. The switch circuit 27 selects the output data of the circuits 25a and 25b corresponding to the type of the disc. The reproduction data selected by the switch circuit 27 is supplied to the interface circuit 4. Thus, data reproduced from the optical disc 3 can be supplied to the host computer 1 through the interface circuit 4. Alternatively, by supplying the header information (ROM/RAM) from the header detecting circuit 26 to the deformatting circuits 25a and 25b, one of these circuits can be operated instead of using the switch circuit 27.

Figure 3:
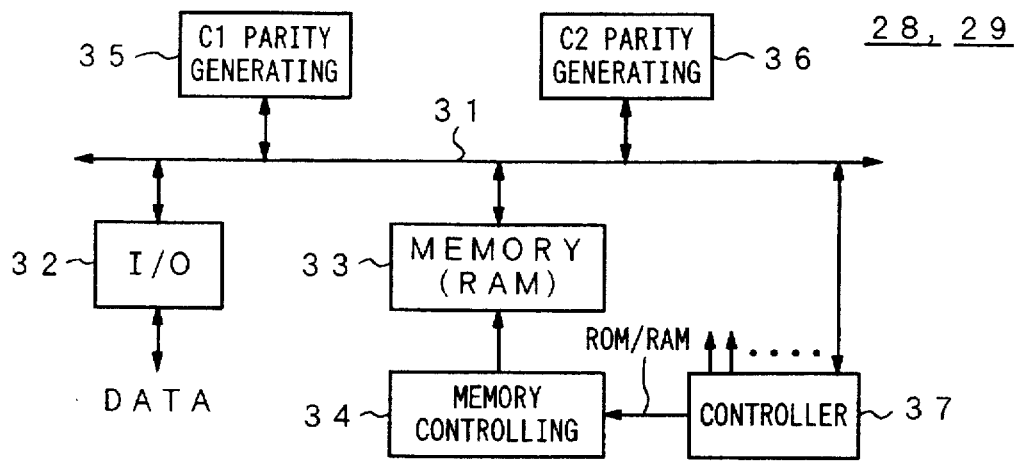
FIG. 3 is a block diagram showing an example of an error correction code encoding circuit.

FIG. 3 is a block diagram showing an example of the structure of an error correction code encoding circuit disposed in a signal processing block 28 that has the formatting circuits 5a and 5b. In FIGS. 2A and 2B, reference numeral 31 is a data bus. The data bus 31 is connected to a data input/output circuit 32, a memory (RAM) 33, a C1 parity generating circuit 35, and a C2 parity generating circuit 36. A read/write operation, an address, and so forth of the memory 33 are controlled by a memory controlling circuit 34. In addition, a controller 37 that controls the operations of the error correction code encoding circuit is provided. A switch control signal ROM/RAM is supplied from the controller 37 to the memory controlling circuit 34. The error correction code encoding circuit shown in FIG. 3 is actually composed of one IC chip.

An error correction code decoder is provided for a signal processing block 29 that has the deformatting circuits 25a and 25b. The structure of the error correction code decoder is the same as that shown in FIG. 3. The hardware of the encoder may be partially shared with the hardware of the decoder.

Figure 4:
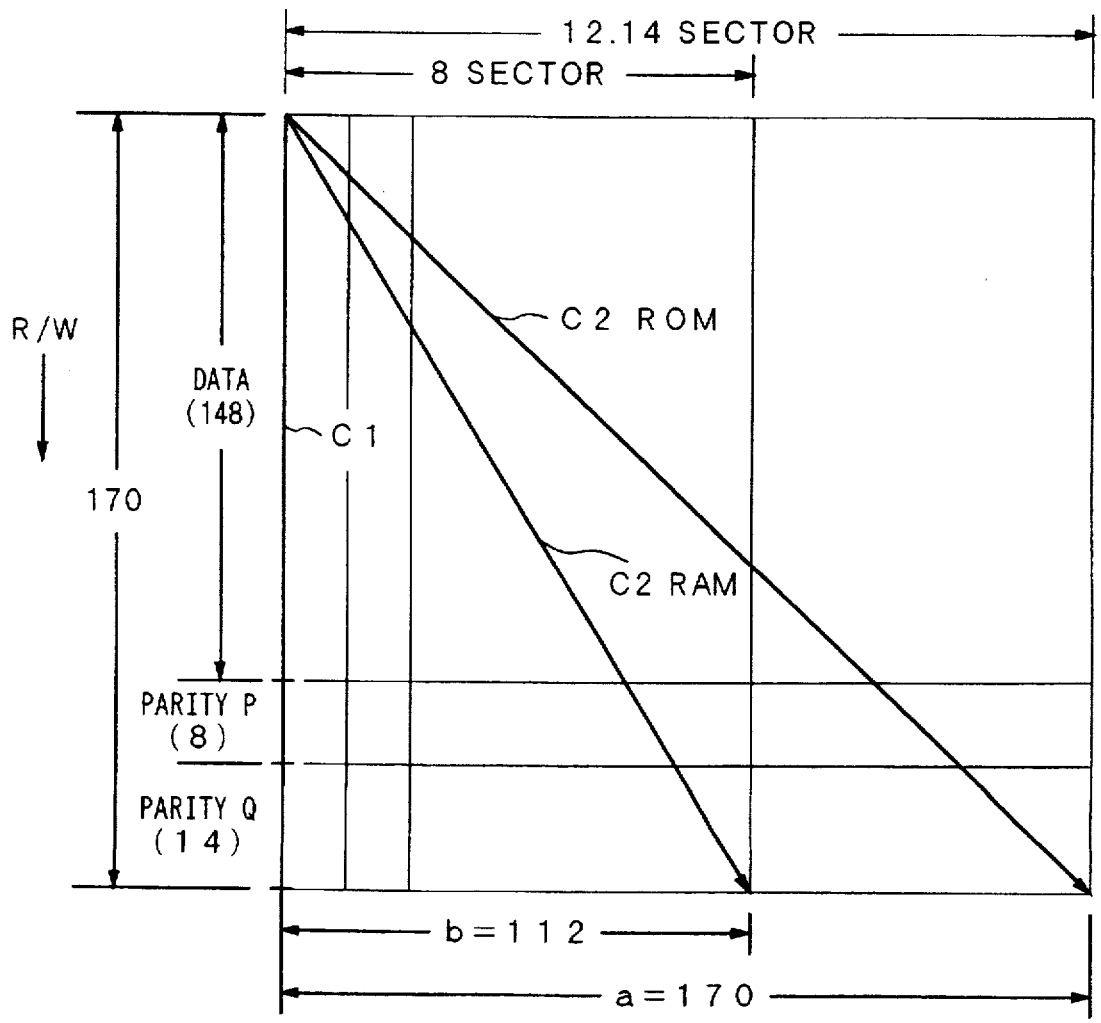
FIG. 4 is a schematic diagram for explaining an error correction code encoding process of which the present invention is applied for a folding type dual code encoding process.

As an example of the error correction code encoding process, a folding type dual code encoding process is used. The interleave length for the ROM type is different from the interleave length for the RAM type. As shown in FIG. 4, data of 148 symbols arranged in vertical direction (recording/reproducing direction) (1 symbol=1 byte) and a C2 code parity (parity Q) of 14 symbols are encoded with a [170, 162, 9] Reed-Solomon code. Thus, a C1 code parity (parity P) of 8 symbols is generated. Data of 148 symbols (1 symbol=1 byte) and the parity P of 8 symbols are encoded with a [170, 156, 15] Reed-Solomon code. Thus, a parity Q of 14 symbols is generated.

As shown in FIG. 4, in the interleaving process for the C2 code, the interleave length a for the ROM type and the interleave length b for the RAM type have the relation of (a>b) (for example, a=170 and b=112). Generally, the error correction performance (especially, against a burst error) is proportional to the interleave length. Thus, the error correction performance for the ROM type is larger than that for the RAM type. In other words, for the ROM type, the data substituting process cannot be performed unlike with the RAM type. When the interleave length is long, since all data thereof should be recorded or reproduced, a long access time is required. Thus, the scale of the interleaving process becomes large. From this point of view, a structure of which the interleave length for the RAM type is shorter than the interleave length for the ROM type is used.

In FIG. 4, the horizontal interleave length b=112 is equal to the number of symbols of which eight sectors are arranged in the horizontal direction shown in FIG. 2A. In other words, the interleave length of the RAM type can be just divided by the number of sectors. When data as blocks of eight sectors is recorded on a disc, the interleaving process is completed within the unit of data for the recording/reproducing operation. Thus, the error correcting process can be quickly performed for the recording/reproducing operation. For the ROM type, the horizontal interleave length is not completed within one block. However, data reproduced from the disc is almost sequential data. Thus, no problem takes place in this case.

Next, with reference to FIG. 3, an example of an encoding/decoding process for correcting errors will be described.

When data is encoded with an error correction code, data that is larger than one block is supplied from the host computer 1 or the optical disc drive 2 to the data input/output circuit (I/O) 32 of the formatting circuit 5a or 5b through the interface circuit (I/F) 4 and then temporarily stored in the memory 33 through the data bus 31. At this point, header information is supplied from the interface circuit 4 to the controller 37. The controller 37 determines whether or not data in the memory 33 is the ROM type or the RAM type and controls the memory controlling circuit 34 so as to control the memory 33 corresponding to the determined type. Thus, the memory controlling circuit 34 designates an address of data read from the memory 33 to the C1 parity generating circuit 35 and the C2 parity generating circuit 35 so that the data is interleaved in the C2 ROM direction for the ROM type and that data is interleaved in the C2 RAM direction for the RAM type as shown in FIG. 4. The encoding process is performed for all data stored in the memory 33 by the C1 parity generating circuit 35, the C2 parity generating circuit 36, and the memory 33. Thereafter, P and Q parities are added to the encoded data. The resulting data is supplied from the memory 33 to the digital modulating circuit 7 through the I/O 32. In this case, the switch circuit 6 is accomplished in such a manner that the controller 37 shown in FIG. 3 controls the output of one of two data types through the I/O 32.

Next, an error correction code decoding process for decoding data reproduced from a disc will be described. Data that has been modulated by such as 8–16 modulating method is demodulated by the digital demodulating circuit 24 and several blocks of the demodulated data are stored in the memory 33 of the deformatting circuit 25a or 25b. The controller 37 detects the sector type (ST) of the header portion of the sector structure data stored in the memory 33. The controller 37 controls the memory controlling circuit 34 corresponding to the detected type as with the encoding operation. In other words, data that is interleaved is restored to original data (this process is referred to as deinterleaving process). The C1 parity generating circuit 35 and the C2 parity generating circuit 36 multiply the deinterleaved data by a predetermined coefficient stored in a memory (ROM) (not shown) so as to correct error of the C1 sequence and the C2 sequence, respectively. The error corrected data is stored in the memory 33. The error-corrected data is supplied from the memory 33 to the interface circuit 4 through the I/O 32. The switch circuit 27 is accomplished in such a manner that the controller 37 supplies output data of the I/O 32 as one of the ROM type or RAM type.

Figure 5:
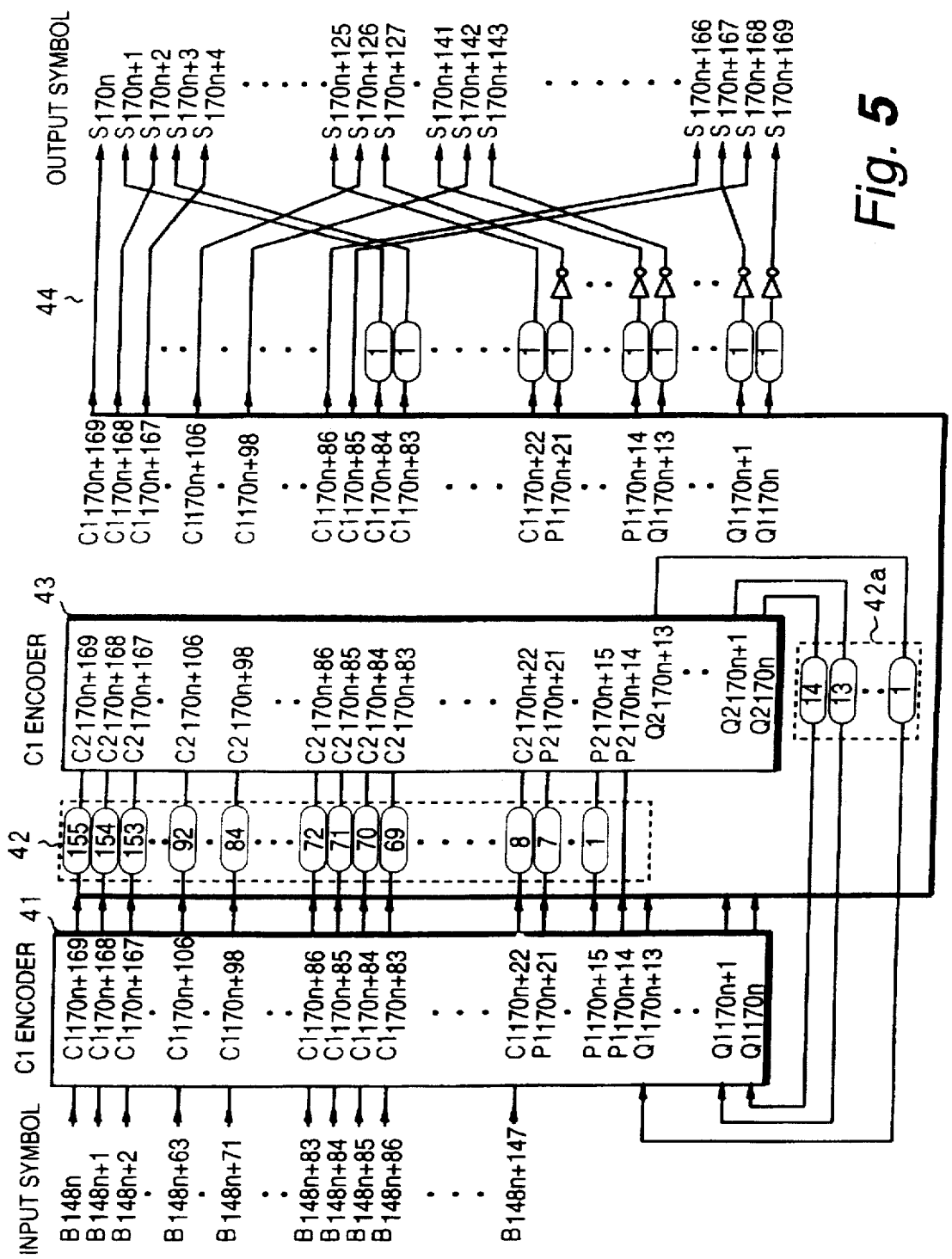
FIG. 5 is a functional block diagram showing an example of an error correction code encoding process in a record processing circuit.
Figure 6:
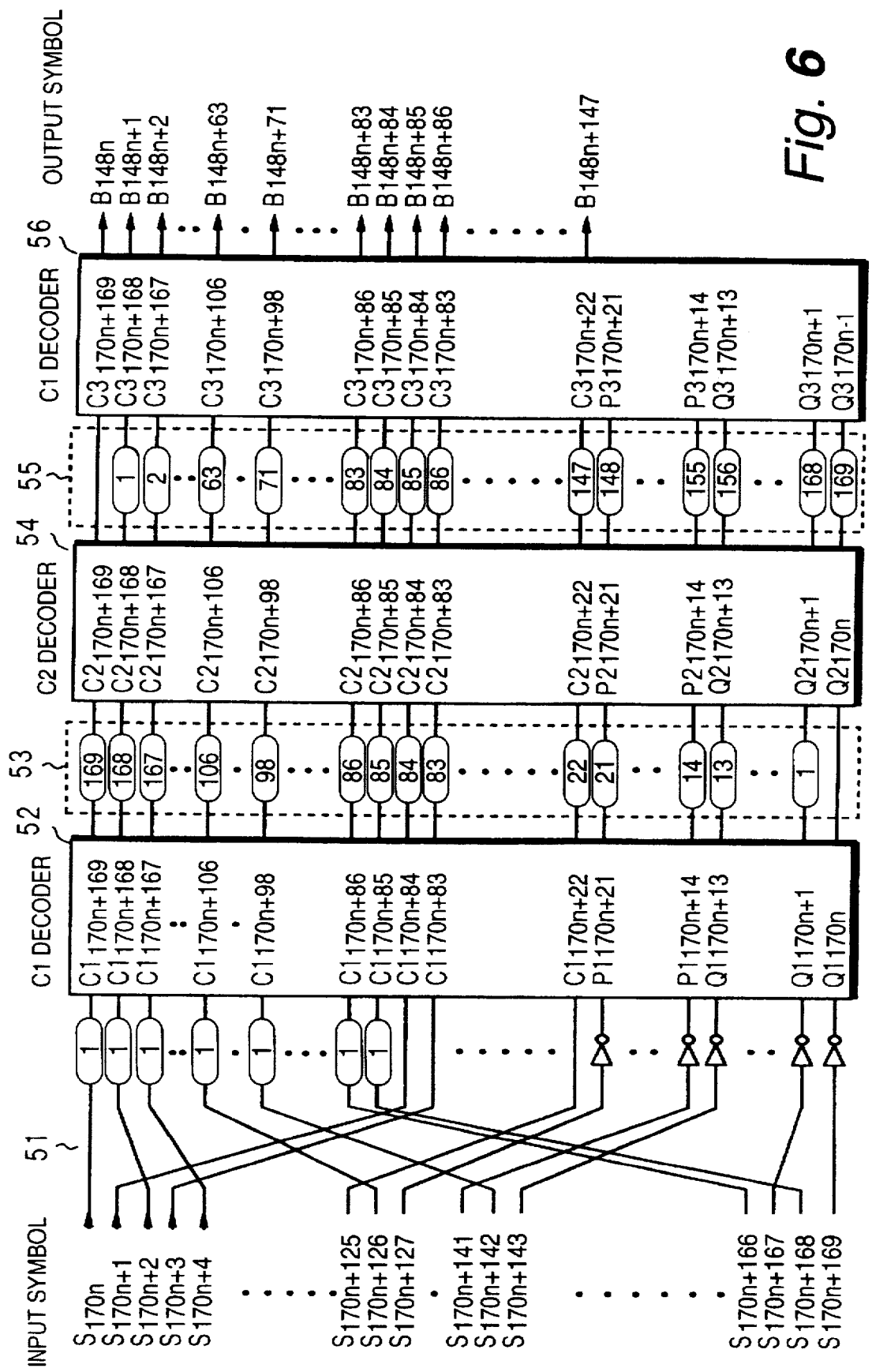
FIG. 6 is a functional block diagram showing an example of an error correction code decoding process in a reproduction processing circuit.
Figure 7:
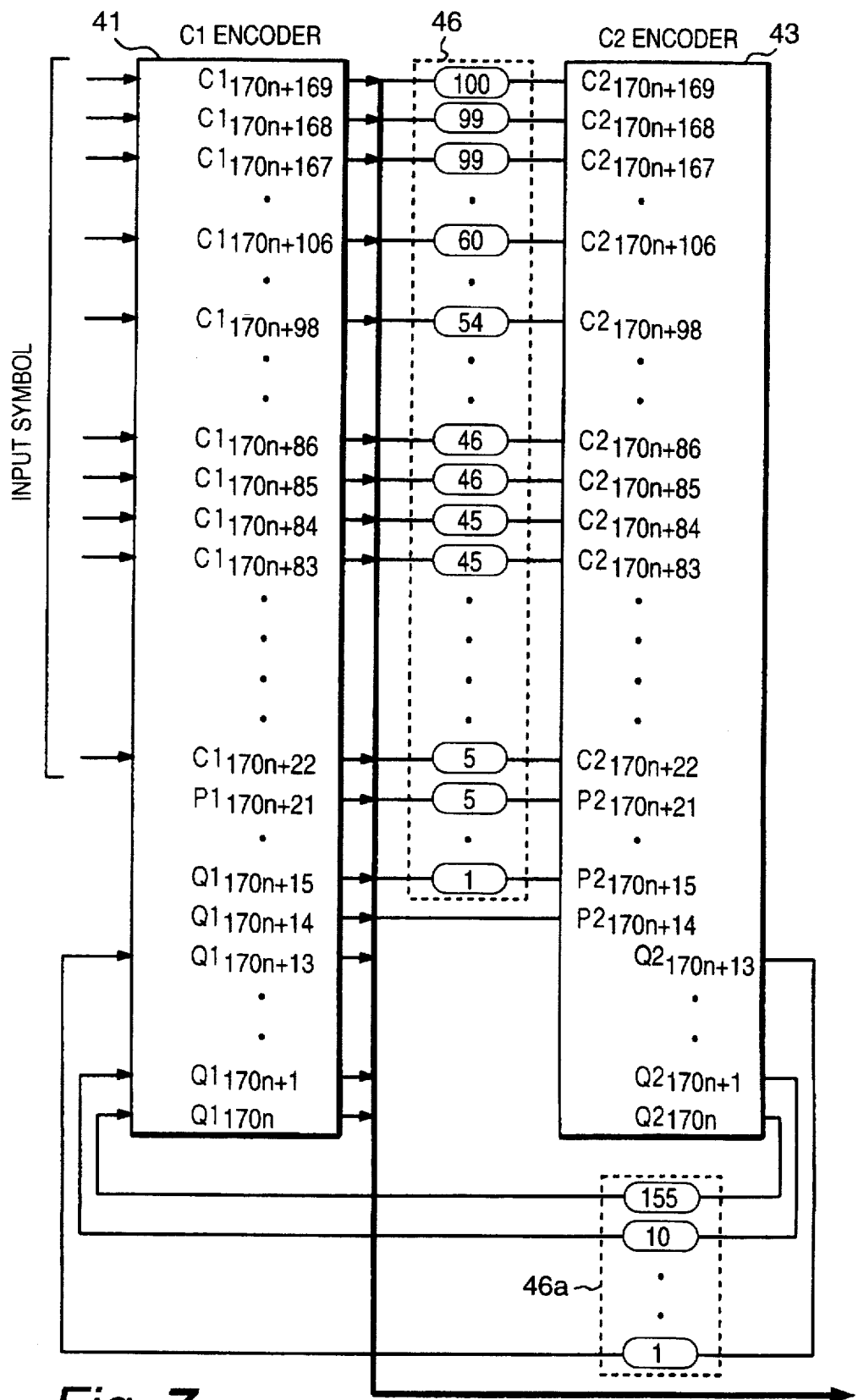
FIG. 7 is a functional block diagram showing another example of an error correction code encoding process in a record processing circuit.

FIGS. 5 and 6 are functional block diagrams showing an error correction code encoding process and an error correction code decoding process. FIG. 5 is a functional block diagram showing the above-described folding type dual code encoding process (for the ROM type). The error correction code is similar to the cross interleave Reed-Solomon code (CIRC) used for a CD.

Input symbols of 148 bytes are supplied to a C1 encoder 41. The output data of the C1 encoder 41 (data symbols of 148 bytes and a parity P of 8 bytes) is supplied to a C2 encoder 43 through a delaying circuit group 42. In the structure shown in FIG. 3, the delaying process of the delaying circuit group 42 is accomplished by the memory 33 and the memory controlling circuit 34.

The C2 encoder 43 performs an encoding process with the [170, 156, 15] Reed-Solomon code and generates a parity Q of 14 bytes. The C1 encoder 41 performs an encoding process for not only data, but parity Q with a C1 code. Thus, the C2 encoder 43 feeds back the parity Q to the C1 encoder 41 from the C2 encoder 43 through the delaying circuit group 42a. Thus, the C1 encoder 41 performs an encoding process with the [170, 162, 9] Reed-Solomon code.

170 bytes (data of 148 bytes, a C1 parity of 8 bytes, and a C2 parity of 14 bytes) received from the C1 encoder 41 are extracted as output symbols through an array changing circuit 44 including a delaying circuit. The array changing circuit 44 is composed of the memory 33 and the memory controlling circuit in the structure shown in FIG. 3. The output symbols are supplied to the digital modulating circuit 7. The interleave length of the folding type dual code encoding process is 170 frames (that represents the length of the C1 code sequence). The interleave length is also referred to as the restriction length of the interleave or the depth of the interleave.

Next, with reference to FIG. 6, the process of the decoder corresponding to the encoder shown in FIG. 5 will be described. The input symbols (of 170 bytes) are supplied from the digital demodulating circuit 24 to a C1 decoder 52 through an array changing circuit 51. The array changing circuit 51 performs the reverse process of the array changing circuit 44 of the encoder. The C1 decoder 52 performs a decoding process with a [170, 162, 9] Reed-Solomon code.

The output data of the C1 decoder 52 is supplied to a C2 decoder 54 through a delaying circuit group 53. The C2 decoder 54 performs a decoding process with a [170, 156, 15] Reed-Solomon code. The decoded output data of the C2 decoder 54 is supplied to a C1 decoder 56 through a deinterleave delaying circuit 55. Thus, output symbols of 148 bytes that have been error-corrected by the C1 decoding process, the C2 decoding process, and the C1 decoding process are extracted.

By changing the delay amounts of the delaying circuit groups 42, 53, and 55, the interleave length can be changed to the RAM type value 112. In the structure shown in FIG. 3, as described above, the switch control signal ROM/RAM is supplied to the memory controlling circuit 34 so as to switch the address control of the memory controlling circuit 34. Thus, the delay amounts are changed. In this example, since the relation of (170>112) is satisfied, the delay amount of 0 is added so as to accomplish the interleave length of 112.

Figure 8:
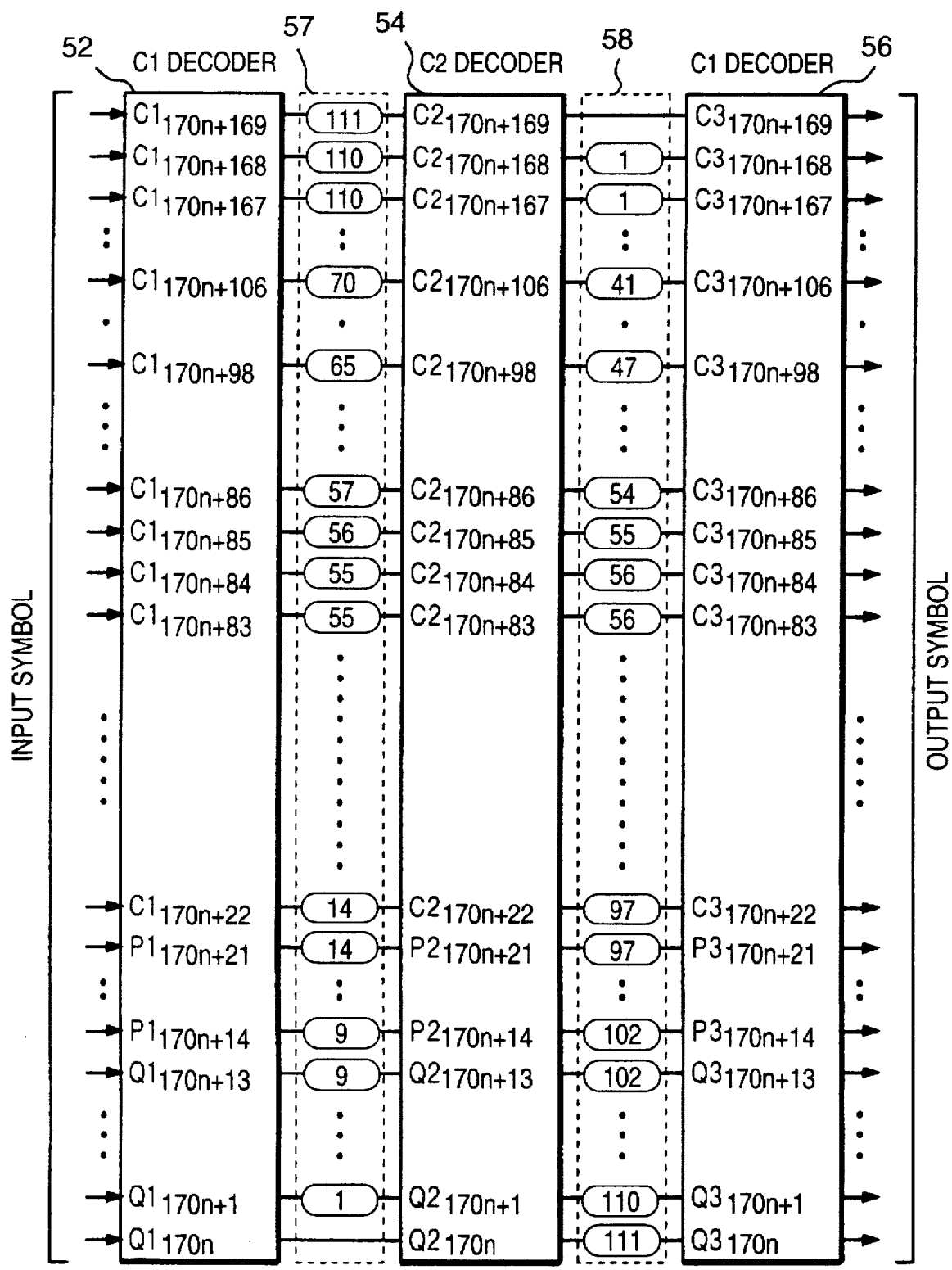
FIG. 8 is a functional block diagram showing another example of an error correction code encoding process in a reproduction processing circuit.

For example, in the encoding process, since the delay amounts of the delaying circuits 46 and 46a for two adjacent signals are equally designated, a delaying process for 112 symbols is performed. In the decoding process, as shown in FIG. 8, the delay amounts of the delaying circuit groups 57 and 58 for two adjacent circuits are equally designated. Thus, an input symbol of 170 bytes of which the interleave length is 112 is deinterleaved and outputted.

Figure 9:
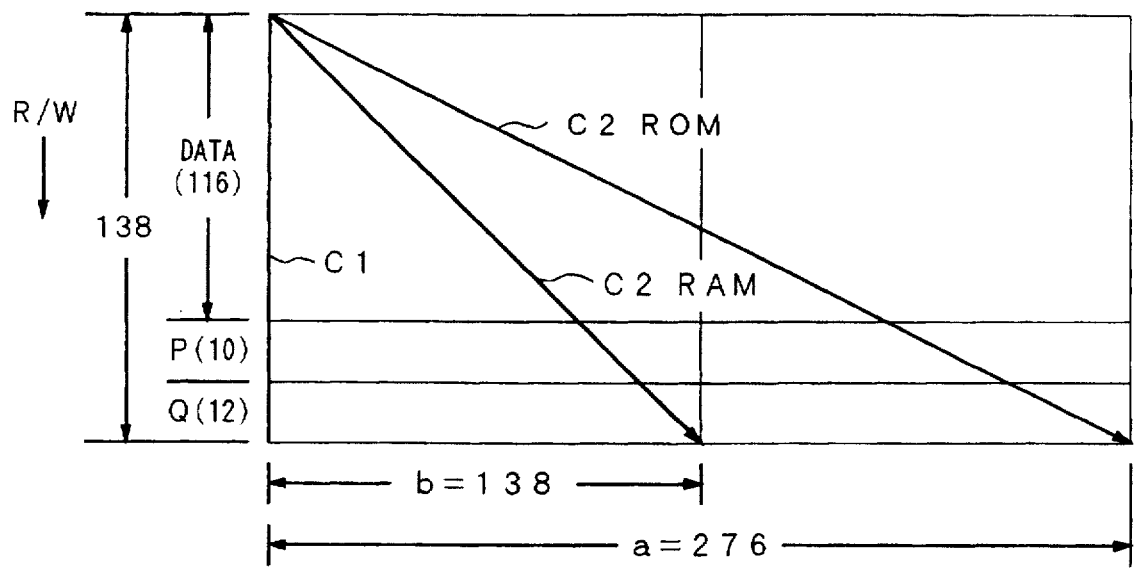
FIG. 9 is a schematic diagram for explaining another example of the error correction code encoding process of which the present invention is applied for the folding type dual code encoding process.

FIG. 9 shows another example of the folding type dual code as an error correction code. When the number of symbols of data is 116 (bytes), in the feedback type structure as with the structures shown in FIGS. 5 and 6, a parity P of 10 symbols and a parity Q of 12 symbols are formed. In other words, in the example shown in FIG. 9, the C1 encoder performs an encoding process with a [138, 128, 11] Reed-Solomon code and the C2 encoder performs an encoding process with a [138, 126, 13] Reed-Solomon code. At this point, the interleave length for the ROM type is (a=276), whereas the interleave length for the RAM type is (b=138). Since the length of the C1 code sequence is 138 symbols, by the delaying process that varies the symbols one by one, an interleave of b=138 can be accomplished in the error correction code ending process and the error correction code decoding process. By a delaying process that varies the symbols two by two, an interleave of a=276 can be accomplished.

Figure 10:
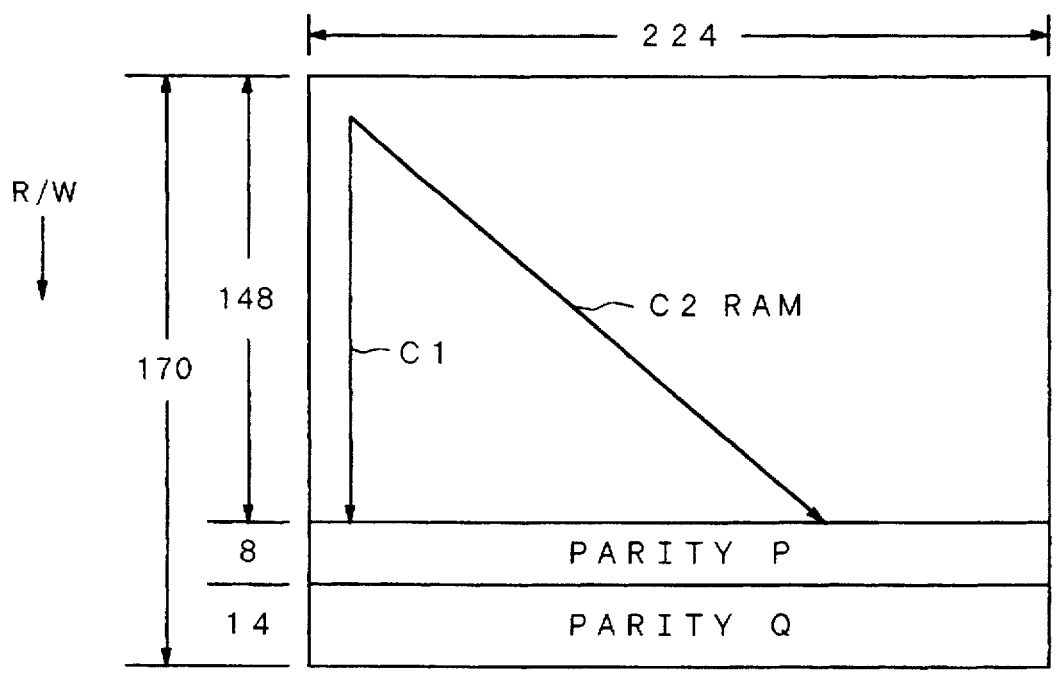
FIG. 10 is a schematic diagram for explaining an example of a block completion type error correction code in the case that the folding type dual code encoding process and the block completion type encoding process are used.

As described in the embodiment, the interleave length is varied depending on whether the current disc is the ROM type or the RAM type. The folding type dual code encoding process (interleave length a=170) may be performed for the ROM type. The block completion type dual code encoding process is performed for the RAM type. In the block completion type process, data of a two-dimensional array with a predetermined size is treated as a block and the interleaving process is performed in the block. FIG. 10 is a schematic diagram showing a block completion type dual code encoding process. 148 symbols that are arranged in the vertical direction (read/write direction) of (148×224) symbols of a block are encoded with a C1 code Reed-Solomon code so as to generate the parity P. In addition, data in the diagonal direction is encoded with a Reed-Solomon code so as to generate a C2 code parity Q. As with the above-described embodiment, the memory controlling circuit 34 controls the memory 33 so as to perform the interleaving process in the diagonal direction.

As the block completion type dual code encoding process, the non-feedback type or the feedback type may be used. For example, the folding type dual code encoding process used in a CD is the non-feedback type process. In the case of the non-feedback type, an encoding process is performed with a [162, 148, 15] Reed-Solomon code that is the C2 code. Thus, the parity Q of 14 bytes is generated. In addition, data and the parity Q are encoded with a [170, 162, 9] Reed-Solomon code that is the C1 code. Thus, a parity of 8 bytes is generated. When an error correcting process (namely, a decoding process) is performed, the C1 code is decoded. Thereafter, the C2 code is decoded. On the other hand, in the feedback type, as with the structure shown in FIG. 5, the parity Q is encoded with a [170, 162, 9] Reed-Solomon code. Thus, the parity P is generated. In addition, data and the parity P are encoded with a [170, 156, 15] Reed-Solomon code.

Figure 11A:
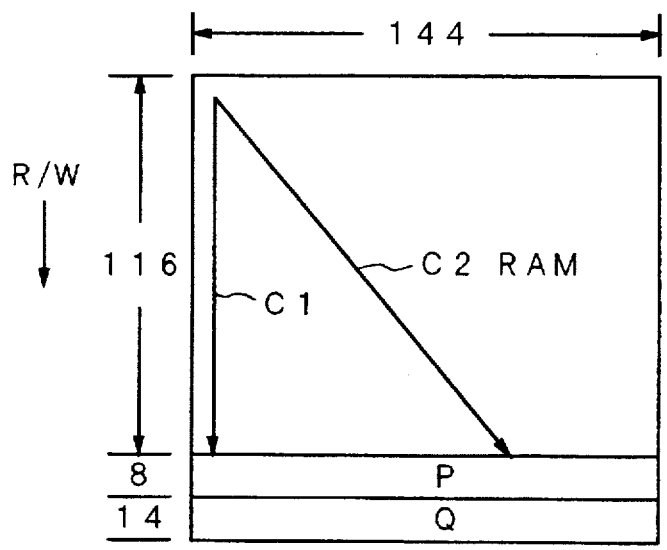
FIGS. 11A and 11B are schematic diagrams for explaining another example of the block completion type error correction code in the case that the folding type dual code encoding process and the block completion type encoding process are used.
Figure 11B:
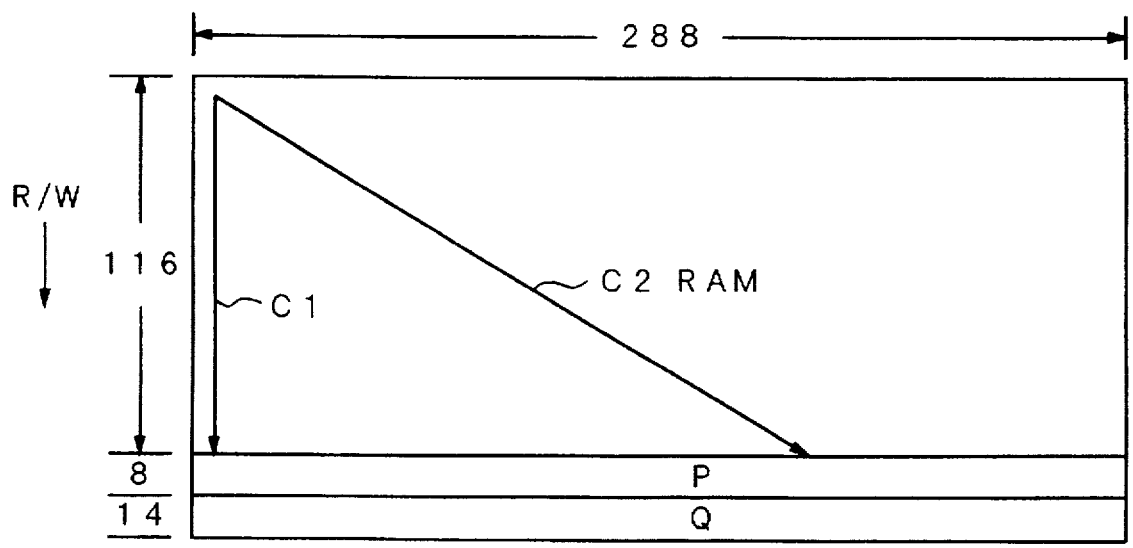

FIGS. 11A and 11B are schematic diagrams showing another example of the block completion type error correction code. In FIG. 11A, the block completion type dual code encoding process is performed for data symbols of 116 (in vertical direction–read/write direction)×114 (in horizontal direction). In FIG. 11B, the block completion type dual code encoding process is performed for data symbols of 116 (in vertical direction–read/write direction)×288 (in horizontal direction). In other words, in FIG. 11B, data shown in FIG. 11A is treated as data of one block and a parity thereof is generated. The block completion type encoding process is performed for the RAM type so as to improve the access characteristic. In the case of the block completion type, the data amount of each block is preferably 16 kbytes, 32 kbytes, or the like.

In addition, according to the present invention, the block size that is the unit of an error correction code may be varied. FIGS. 12A and 12B are schematic diagrams showing another example. As shown in FIG. 12A, the block size of the RAM type is (170 (=data of 148 symbols+a parity of 22 bytes)×14). On the other hand, as shown in FIG. 12B, the block size of the ROM type is (170 (data of 148 symbols+a parity of 22 bytes)×112). In the example shown in FIGS. 12A and 12B, the recording/reproducing direction is the horizontal direction of each block, whereas the encoding direction is the diagonal direction of each block. As a code, a [170, 148, 23] Reed-Solomon code can be used.

It is said that as shown in FIGS. 2A and 2B, when the number of parities for particular data is the same as that for another data, the power of the error correcting process depends on the size of data block. In this case, the diagonal interleaving process is performed by the memory 33 and the memory controlling circuit 34 as with the above-described embodiment.

According to the present invention, error correction code encoding processes corresponding to the RAM type and the ROM type can be performed. In addition, since the interleave length and the block size are varied, hardware can be commonly used for the error correction code encoding process and the error correcting process. Thus, the structure of the hardware can be simplified. Moreover, according to the present invention, a hybrid disc that has both a ROM type region and a RAM type region can be accomplished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data recording apparatus for recording digital data to a data recording medium, comprising:

error correction code encoding means for interleaving a predetermined unit of data to be recorded on a sector basis, each predetermined unit of data including a plurality of sectors where each sector has a sector header, and encoding the interleaved data with an error correction code; and identifying means for identifying whether the data to be recorded is a reproduction-only data or a rewritable data;

wherein said error correction code encoding means is adapted for changing the interleave length corresponding to the output of said identifying means on a sector size basis.

2. The data recording apparatus as set forth in claim 1 wherein said error correction code encoding means is adapted for encoding a first sequence and a second sequence, at least one of the first and second sequences being a folding type encoding sequence.

3. The data recording apparatus as set forth in claim 1 wherein said error correction code encoding means is adapted for encoding at least two encoding sequences with different interleave lengths and encoding an encoding sequence that has a longer interleave length when an input data is the reproduction only data.

4. The data recording apparatus as set forth in claim 1 wherein said error correction code encoding means is adapted for encoding data that exceeds a recording data unit with a folding type encoding sequence when an input data is said reproduction-only data and for interleaving and encoding data that is completed within the recording data unit when the input data is said rewritable data.

5. The data recording apparatus as set forth in claim 1, further comprising adding means for adding an identification data that represents whether said data identified by said identifying means is said reproduction-only data or said rewritable data.

6. A data recording method for recording digital data to a recordable data recording medium, said method comprising the steps of:

interleaving a predetermined unit of data to be recorded on a sector basis, each predetermined unit of data including a plurality of sectors where each sector has a sector header, and encoding the interleaved data with an error correction code;

recording the encoded data on a recording medium; and identifying that the data to be recorded is a reproduction-only data or a rewritable data so as to change the interleave length on a sector basis;

wherein the error correction code is a folding type code.

7. The data recording method as set forth in claim 6 wherein said error correction code encoding step includes the step of interleaving a data with a longer interleave length than that of said rewritable data when said data to be recorded is said reproduction-only data.

8. The data recording method as set forth in claim 6 wherein said error correction code encoding step includes the step of interleaving a data that is completed in a recording data unit when the data to be recorded is said rewritable data.

9. The data recording method as set forth in claim 6 further comprising the step of adding to the identified data an identification data that represents the interleave length thereof.

10. A method for encoding and decoding data recorded on a reproduction-only disc and a recordable disc with an error correction code, said method comprising the steps of:

identifying whether an input data is a reproduction-only data or a rewritable data when the input data is recorded on a sector basis, each data including a plurality of sectors where each sector has a sector header;

interleaving the input data corresponding to the identified data and encoding the interleaved data with an error correction code;

identifying whether the input data is said reproduction-only data or said rewritable data when the input data is reproduced on a sector basis; and deinterleaving the reproduced data corresponding to the identified data and correcting an error of the deinterleaved data with the error correction code.

11. The method as set forth in claim 10 further comprising the step of, when data is recorded and said identified data is said reproduction-only data, designating a larger interleave length to the reproduction-only data than that of the recordable data.

12. The method as set forth in claim 10, wherein said encoding step is performed by interleaving data recorded as a predetermined unit of blocks, interleaving the reproduction-only data with an interleave length that is larger than the block size, and interleaving the rewritable data with an interleave length that is smaller than the block size.

* * * * *